United States Patent

[11] 3,582,881

[72] Inventor Herbert O. Burton
Little Silver, N.J.

[21] Appl. No. 831,643
[22] Filed June 9, 1969
[45] Patented June 1, 1971
[73] Assignee Bell Telephone Laboratories, Incorporated
Murray Hill, N.J.

[54] BURST-ERROR CORRECTING SYSTEMS
6 Claims, 4 Drawing Figs.

[52] U.S. Cl. .................. 340/146.1, 235/153
[51] Int. Cl. .................. G08c 25/00, G06f 11/12
[50] Field of Search .................. 340/146.1; 235/153

[56] References Cited

UNITED STATES PATENTS 3,227,999 2/1966 Hagelbarger .................. 340/146.1
3,335,409 8/1967 Heller et al. .................. 340/146.1X

OTHER REFERENCES

W. W. Peterson, " Error Correcting Codes", MIT Press and John Wiley & Sons, Inc., 1961, pp. 183— 200.
Albert G. Franco, " Coding For Error-Free Communications" , Electro-Technology, January 1968, pp. 53 and 55—62.

*Primary Examiner*—Malcolm A. Morrison
*Assistant Examiner*—Charles E. Atkinson
*Attorneys*—R. J. Guenther and Kenneth B. Hamlin

ABSTRACT: A subclass of Fire codes is utilized to construct a new general class of asymptotically optimal burst-error-correcting block codes. Encoders and decoders for the new codes are characterized by ease of implementation.

INVENTOR
H.O. BURTON
BY Lucian C. Canepa
ATTORNEY

| ROW NO. | SN0 | SN1 | SN2 | SN3 | SN4 | SN5 | SN6 | SN7 | SN8 | SN9 | SN10 | SN11 | SN12 | SN13 | SN14 | SN15 | SN16 | SN17 | SN18 | SN19 | SN20 |
|---|---|---|---|---|---|---|---|---|---|---|---|---|---|---|---|---|---|---|---|---|---|
| | CHECK DIGIT SECTION | | | | | | INFORMATION DIGIT SECTION | | | | | | | | | | | | | | |
| 1 | C303 | C302 | C301 | C3 | C2 | C1 | I1203 | I1202 | I1201 | I903 | I902 | I901 | I603 | I602 | I601 | I303 | I302 | I301 | I3 | I2 | I1 |
| 2 | C306 | C305 | C304 | C6 | C5 | C4 | I1206 | I1205 | I1204 | I906 | I905 | I904 | I606 | I605 | I604 | I306 | I305 | I304 | I6 | I5 | I4 |
| 3 | C309 | C308 | C307 | C9 | C8 | C7 | I1209 | I1208 | I1207 | I909 | I908 | I907 | I609 | I608 | I607 | I309 | I308 | I307 | I9 | I8 | I7 |
| 100 | C600 | C599 | C598 | C300 | C299 | C298 | I1500 | I1499 | I1498 | I1200 | I1199 | I1198 | I900 | I899 | I898 | I600 | I599 | I598 | I300 | I299 | I298 |

BURST-ERROR CORRECTING SYSTEMS

BACKGROUND OF THE INVENTION

1. Field of the Invention

This invention relates to a new class of codes and more particularly to the utilization of these codes to construct systems adapted to automatically correct error bursts.

2. Description of the Prior Art

The problem of transmitting digital signals in a reliable manner over a noisy communication path is a significant one whose solution has been actively sought. By using techniques of redundancy, it is possible to encode digital signals to be transmitted in such a way that a receiving terminal is able with a high degree of reliability to automatically correct received signals that are not exact replicas of the transmitted ones.

In particular, it has heretofore been proposed to encode digital words to be transmitted in accordance with so-called burst-error-correcting block codes. One such known class of codes is described in P. Fire U.S. Pat. No. 3,159,810, issued Dec. 1, 1964. The Fire codes are not, however, particularly attractive when measured against the standard or bound set forth by S. H. Reiger in "Codes for the Correction of Clustered Errors," *IRE Transactions on Information Theory*, Vol. IT–6, 1960.

Codes which meet or approach the Reiger bound are known. These codes are designated as being optimal or near-optimal in nature. Unfortunately, not very many such optimal or near-optimal burst-error-correcting block codes are known, and the relative unavailability of these types of codes imposes a severe limitation on the designers of error control equipment.

SUMMARY OF THE INVENTION

Accordingly, an object of the present invention is a new general class of near-optimal burst-error-correcting block codes.

More specifically, an object of this invention is a new class of such codes which can be easily and simply implemented.

Briefly stated, these and other objects of the present invention are realized in a specific illustrative embodiment thereof that comprises the encoding and decoding circuitry of an error control system. The particular new code embodied in the system is capable of correcting any error burst of length 3 or less provided that each such burst is restricted to occur within one of seven 3-tuples of a redundant 21-digit word. This restriction on the location of error occurrences is in effect removed by interleaving 3-tuples from 100 code words. Such a system exhibits a near-optimal burst-error-correcting capability.

It is, therefore, a feature of the present invention that a new block code capable of correcting a restricted type of error burst be embodied in an error-correcting system and that the restriction be in effect removed by interleaving groups of digits from each of a plurality of encoded words.

BRIEF DESCRIPTION OF THE DRAWING

A complete understanding of the present invention and of the above and other objects, features and advantages thereof may be gained from a consideration of the following detailed description of a specific illustrative embodiment thereof presented hereinbelow in connection with the accompanying drawing, in which.

DETAILED DESCRIPTION

Figure 1:
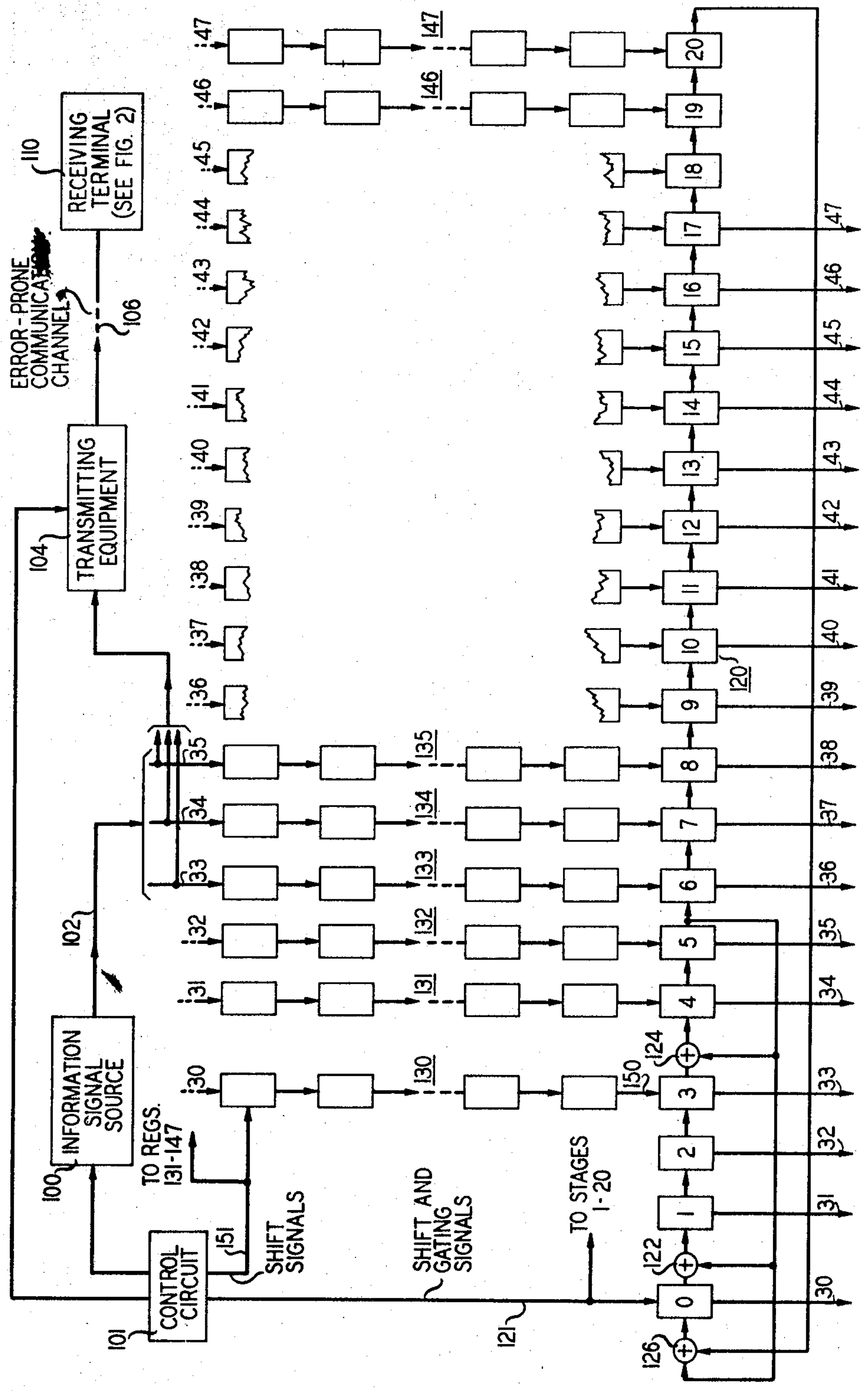
FIG. 1 depicts an error control system made in accordance with the principles of this invention and in particular shows in detail the encoding circuitry thereof.

In accordance with the principles of the present invention, restrictions are imposed on the known generator polynomial $g(x)=p(x)(x^m-1)$ of the aforementioned Fire codes. More specifically $p(x)$ is selected to be an irreducible polynomial of degree $m$. (For a listing of such polynomials see R. Church, "Tables of Irreducible Polynomials for the First Four Prime Moduli," *Annals of Mathematics*, Vol. 36, No. 1, Jan. 1935.) The resulting generator polynomial is definitive of a subclass of the Fire codes. In particular this invention is based on the recognition that this subclass can correct any error burst of length $m$ or less provided that each such burst is restricted to occur within one of $n/m$ $m$-tuples of a redundant encoded $n$-digit word. A restricted error occurrence of this type will be referred to herein as a phased error burst. (In general a burst of errors of length $b$ is a set of $b$ digits at least the first and last of which are in error.)

In accordance with the principles of the present invention, the limitation imposed by requiring that burst occurrences be of the phased type is in effect removed by interleaving $m$-tuples from $I$ redundant code words. If $I$ code words are interleaved in this fashion, the burst-correcting capability of the resulting interleaved code block is $mI-(m1)$ and the number of parity check digits required therefor is $2Im$. If $I$ assumes very large values, the ratio of the burst-correcting capability of such an interleaved code format to the number of check digits therein approaches one-half which is the value this ratio assumes for optimal codes (see the aforecited reference by Reiger). Hence, the herein described codes are said to be asymptotically optimal.

To take a specific example of the application of the principles of the present invention, assume that $p(x)$ is a polynomial over the field of two elements and has the value $x^3+x+1$. Therefore, $m=3$. For the binary field, $g(x)$ can then be represented as $(x^3+x+1)(x^3+1)$. Illustratively, this expression will be employed as the generator polynomial for a code having a (21, 15) format. In accordance with well-known coding theory, this polynomial specifies the exact manner in which each 15-digit word supplied by an information source is to be processed to generate an associated 6-digit parity check sequence thereby to form a 21-digit encoded word.

As indicated above, applicant's invention is based on the recognition that such an encoded 21-digit word possesses the capability, when suitably decoded, to automatically correct any 3-digit phased error burst occurrence therein. In other words, if such a word is regarded as comprising a sequence of 21 digits divided into seven consecutive sets of three digits each, any error occurrence limited to one such set or 3-tuple can be corrected.

After interleaving a plurality, say 100, of such 21-digit encoded words in the particular manner specified below, an illustrative system made in accordance with the principles of the present invention is capable of automatically correcting *any* error burst of length 298 digits or less. The optimal burst-error-correcting capability of a block code of this general format is 300 digits. Accordingly, it is apparent that the system devised by applicant is structured to possess powerful (near optimal) error-correcting capabilities.

Herein the term "$m$-tuple" is to be understood to designate a set of $m$ consecutive digits. More specifically, with reference to a redundant encoded $n$-digit word, each such set comprises the $m$ consecutive digits included in one of the $n/m$ consecutive $m$-tuples that comprise the word. Thus, each $m$-tuple occupies a predetermined phased position in the $n$-digit word format.

Moreover, the term "spaced apart" as applied herein to $m$-tuples is to be understood to refer to nonadjacent phased sets of $m$ digits that are separated by at least one intervening $m$-tuple.

Figure 2:
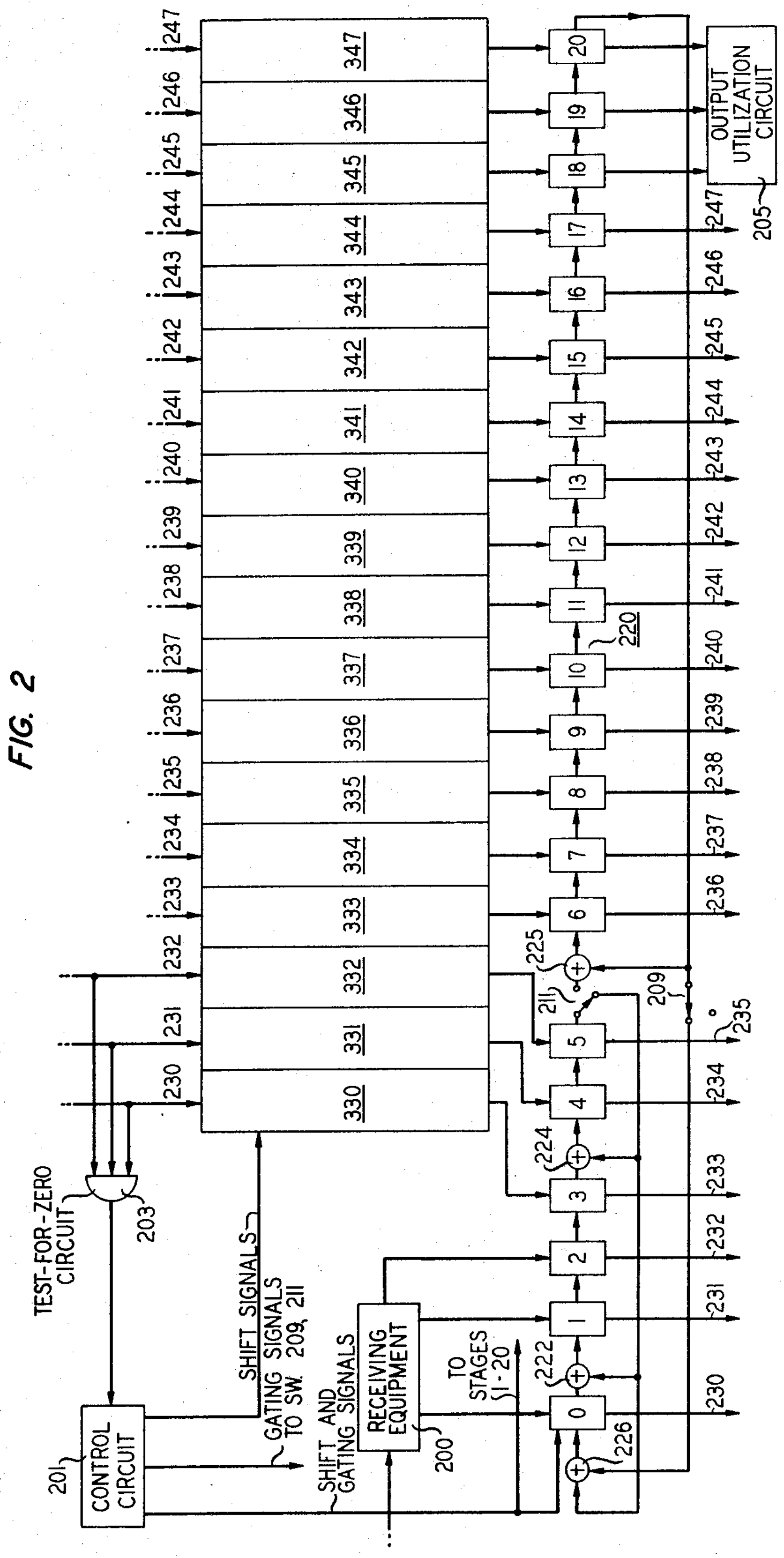
FIG. 2 illustrates in detail the decoding circuitry of such a system.

The encoding, interleaving and decoding of 100 15-digit information words in accordance with the principles of this invention will be best understood by considering the operation of the specific illustrative error correcting system shown in FIGS. 1 and 2.

FIG. 1 includes a source 100 that is adapted, in response to control signals supplied thereto from a circuit 101, to apply 1,500 information signals, three at a time in parallel, to a three-conductor cable 102. (Alternatively, the source 100 may apply information signals in serial form to a series-to-parallel converter.) Thus, for example, if the first three information signals supplied by the source 100 are designated I1, I2 and I3, these signals are applied in parallel via the cable 102 to leads 35, 34, and 33, respectively, and to transmitting equipment 104. The equipment 104 may, for example, include modulators, amplifiers, multiplexing equipment or any other facilities necessary to prepare the signals for application to an error-prone communication channel 106. Illustratively the equipment 104 includes a parallel-to-series converter for applying to the channel 106 in sequential form each 3-tuple supplied by the source 100. Thus, the first three information signals comprising the first 3-tuple are applied to the channel 106 in sequence in the order I1, I2, and I3. The remaining 1497 information signals are also applied to the channel 106 in sequence immediately following I1, I2, and I3.

A receiving terminal 110, shown in detail in FIG. 2 and described later below, is connected to the far end of the channel 106. Decoding and automatic correction of redundant sequences that are mutilated during propagation along the channel 106 take place in the terminal 110.

Before considering the manner in which information signals applied to the leads 33 through 35 of FIG. 1 are processed, the other elements shown in FIG. 1 will be identified. These elements include a 21-stage encoding shift register 120 whose stages are numbered from left to right from 0 through 20. Stages 0 through 5 constitute the parity check digit section of the register 120 whereas stages 6 through 20 comprise the information digit section thereof. In response to shift and gating signals applied thereto from the control circuit 101 via a cable 121, the stages of the register 120 are adapted to propagate signals to the right in a conventional stage-by-stage and digit-by-digit manner. A signal so propagated is applied to the next adjacent stage on the right of a particular stage. This is done via a direct electrical connection or in the case of stages 0 and 3 via exclusive-OR circuits 122 and 124, respectively. Moreover, the output of stage No. 20 is applied via an exclusive-OR circuit 126 to stage No. 0. In addition, the output of stage No. 5 is also applied to the circuits 122, 124, and 126.

The aforementioned shift and gating signals applied to the register 120 from the control circuit 101 are effective to activate conventional gating circuitry (not shown) in the stages 0 through 20 to achieve the above-described left-to-right shifting action. The circuit 101 is also adapted to selectively deactivate this gating circuitry in the register 120 thereby to convert the register into an arrangement comprising 21 unconnected stages. Moreover, the circuit 101 can activate other conventional gates (not shown) in the register 120 to cause the respective representations stored in the stages 0 through 17 to appear on output leads 30 through 47 thereof.

In addition, input signals may be respectively applied to stages 3 through 20 of the register 120 from the outputs of a plurality of multistage shift registers 130 through 147 each of which is disposed in FIG. 1 in a vertical or columnar fashion. Thus, for example, the output of the leftmost one 130 of these vertically disposed shift registers is shown as being applied via a lead 150 to stage No. 3 of the register 120. Illustratively, for the case in which $l$=100, the register 130 and each of the other 17 vertically disposed registers 131 through 147 each include $l$—1 or 99 stages. Shifting of signals downward through the registers 130 through 147 in a stage-by-stage manner is accomplished by applying thereto shift signals from the circuit 101 via a cable 151.

Input signals are applied to the registers 130 through 147 of FIG. 1 via leads 30 through 47, respectively, which are shown extending into the topmost stages thereof. These leads 30 through 47 are in fact connected to the leads 30 through 47, respectively, which are the output leads of stages 0 through 17 of the register 120. These direct electrical connections have not actually been shown so as not to unduly clutter the drawing. The effect of these connections is, for example, that the representations stored in stages 0 through 2 of the register 120 can be applied to the input leads 30 through 32, respectively, of the registers 130 through 132. In a similar way it is apparent that each set of 3 stages of the stages 3 through 17 of the register 120 is adapted to furnish input signals to a corresponding set of three registers selected from the group 133 through 147.

As indicated above, input information signals supplied by the source 100 in 3-tuple form are applied to the leads 33 through 35. In this way, under control of the circuit 101, information signals can be propagated down through the registers 133 through 135 and into the register 120. Thus, for example, after 100 shifts, the information signals designated I1, I2, and I3 will be stored in stages 8, 7, and 6, respectively, of the register 120, and the stages of the registers 133 through 135 will be loaded with the subsequently supplied 297 information signals. At that time, the top most stages of the registers 135, 134, and 133 will contain the information signals designed I298, I299, and I300, respectively. Concurrently, as mentioned earlier, the first 300 information signals are applied to the transmitting equipment 104 for application to the channel 106.

The loading of the registers 120 and 133 through 147 of FIG. 1, preparatory to the encoding operations to be described later below, continues until the source 100 has supplied 1,500 information digits. Initially, these digits are stored in stages 6 through 20 (the information digit section) of the register 120 and in the 1,485 stages of the registers 133 through 147. During this loading operation no left-to-right shifting or signals through the register 120 occurs. Instead, stages 6 through 20 of the register are controlled by the circuit 101 to function in effect as additional or bottommost stages of the respective vertically disposed shift registers 133 through 147. This mode of operation of the registers will be referred to hereinafter as the loading mode. During loading and at the time the initial loading of the first 1,500 information digits is completed, stages 0 through 5 of the register 120 and all the stages of the registers 130 through 132 are assumed to store "0" representations.

Figures 3, 4:
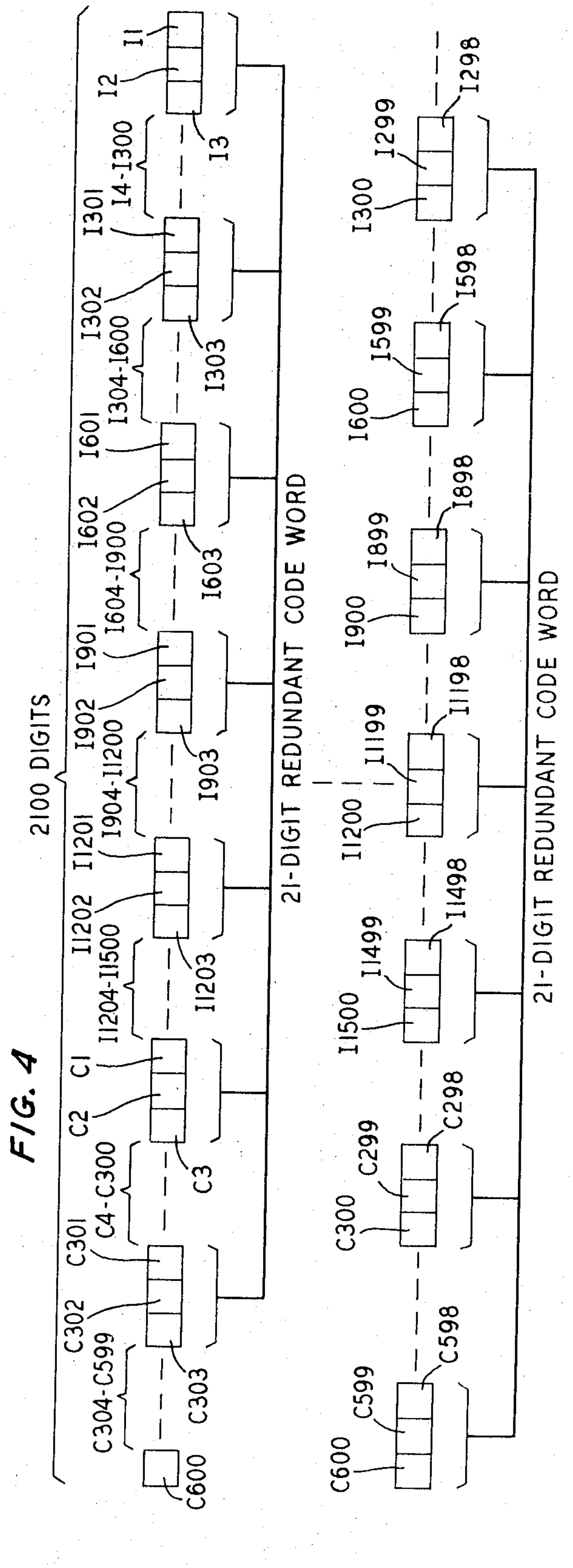
FIGS. 3 and 4 represent the format of code words processed by the illustrative system.

The set of information digits that is stored in stages 6 through 20 of the register 120 at the time the loading operation is completed is specified in row No. 1 of FIG. 3. (In FIG. 3, the designations SNO through SN20 refer respectively to stages 0 through 20 of the register 120.) Thus, as indicated in row No. 1, the rightmost set of three stages SN20, SN19 and SN18 have stored therein information digits I1, I2, and I3, respectively. The next three information digits I301 through I303 are stored in SN17 through SN15, respectively. I601 through I603 are respectively stored in SN14 through SN12; I901 through I903 are stored in SN11 through SN9, respectively; and I1201 through I1203 are stored in SN8 through SN6, respectively.

It is apparent that the 15 information digits represented in row No. 1 of FIG. 3 constitute spaced-apart 3-tuples selected from the 1,500 information signals I1 through I1500 that are supplied by the source 100 and applied to the channel 106 (FIG. 1). Illustratively, these 1,500 signals are assumed to be applied to the channel 106 in respective ones of 1,500 consecutive digit positions or time slots. Furthermore, the encoding operations to be described below are assumed to occur relatively rapidly with respect to the duration of one of these time slots. More specifically, the first one of the six check digits generated in response to the 15 information digits shown in row No. 1 of FIG. 3 is assumed to be available for application to the channel 106 in the next or 1,501st digit position. This check digit is designated C1. Similarly, the subsequent 599 check digits are assumed to be available for transmission in the next consecutive 599 digit positions. Actually, as specified below, these 600 check digits are applied to the channel 106 in a spaced-apart 3-tuple fashion.

Encoding of the 15 information digits represented in row No. 1 of FIG. 3 takes place as follows: Under control of the circuit 101 the register 120 is controlled to function as a left-to-right shift register. In this mode of operation the output of stage No. 20 is applied to the exclusive-OR circuit 126, and the output of stage No. 5 is applied to the exclusive-OR circuits 122, 124, and 126. As so configured, all the stages of the register 120 are then shifted in unison *n* or 21 times. Following this shifting operation six parity check signals derived from the aforementioned 15 information signals are respectively stored in stages 0 through 5 (which is the parity check digit section) of the register 120. At that point the register 120 and the registers 130 through 147 are controlled to revert to the so-called loading mode of operation. In this mode the three check signals C1 through C3 stored in stages 5 through 3, respectively, of the register 120 are applied via the leads 33 through 35 to the transmitting equipment 104 for application to the channel 106. In addition the three check signals C301 through C303 respectively stored in stages 2 through 0 of the register 120 are applied via the leads 30 through 32 to the topmost stages of the registers 130 through 132. (These signals C301 through C303 will be subsequently applied to the equipment 104 for application to the channel 106.) Then stages 0 through 2 are cleared to "0." Furthermore, downshifting of the registers 130 through 147 causes stages 3 through 5 of the register 120 to be cleared to "0" and, in addition, causes five new 3-tuples to be applied to stages 6 through 20 of the register 120. Row No. 2 of FIG. 3 depicts the information digits stored in stages 6 through 20 at that point.

Encoding of the 15 information digits represented in row No. 2 of FIG. 3 then takes place. As before, this is accomplished by shifting the register 120 21 times thereby to generate six associated check digits. As indicated in FIG. 3, these associated check digits are designated C4 through C6 and C304 through C306. C4 through C6 are applied from stages 3 through 5 of the register 120 to the transmitting equipment 104 for application to the channel 106 immediately following the transmission of C1 through C3. On the other hand, C304 through C306 are transferred from stages 0 through 2 of the register 120 to the topmost states of the vertically disposed registers 130 through 132.

In accordance with the principles of the present invention, 98 additional encoding operations of the type specified above are carried out by the equipment of FIG. 1. For each such operation, the applicable information digits can be easily determined by reference to and by extending the format of FIG. 3. Row No. 3 therein represents the third encoding operation and row No. 100 represents the last such operation.

Following the last one of the aforementioned 100 encoding operations, the three check digits C298 through C300 stored in stages 3 through 5 of the register 120 are applied to the equipment 104 for application to the channel 106, and C301 through C303 are shifted into stages 3 through 5 from the registers 130 through 132. At that point C304 through C600 are stored in the 297 stages of the registers 130 through 132. Subsequently, these 300 check digits C301 through C600 are applied to the equipment 104 in successive 3-tuples.

In the specific illustrative manner described above, a 1,500-digit information block comprising 100 words is encoded by generating therefor 600 associated party check digits. As indicated the 1,500 information digits with 600 associated check digits appended thereto are applied to the channel 106. These digits are applied thereto in the order I1.....I1500 C1.....C600. The interleaved nature of this 2,100-digit redundant sequence is apparent from a consideration of the locations in the transmitted sequence of the constituent 3-tuples of each of the 100 21-digit encoded words. Thus, for example, as shown in the top row of FIG. 4, the seven 3-tuples that comprise the first 21-digit word formed by the FIG. 1 encoder are represented in their spaced-apart positions in the transmitted 2,100-digit sequence. As mentioned earlier in connection with the discussion of row No. 1 of FIG. 3, these seven 3-tuples are seen to comprise I1 through I3, I301 through I303, I601 through I603, I901 through I903, I1201 through I1203, C1 through C3 and C301 through C303. It is apparent that each of these 3 -tuples is spaced apart from the next subsequent transmitted 3-tuple of this set by a block of 297 digits. Hence, it is evident that an error burst up to 298 digits in length can include *only one* of the seven depicted 3-tuples. And, since the code embodied in the FIG. 1 encoding circuitry has the capability to correct any phased error occurrence in the noted 21-digit word, it is manifest that the specified spacing has provided a sufficient guard interval to make even a 298-digit error burst in the transmitted sequence look like a phased error occurrence insofar as the first encoded word is concerned.

The 3-tuple components of each of the other 99 21-digit words encoded by the FIG. 1 circuitry are interleaved in the transmitted sequence also to provide guard spaces therebetween each 297 digits in length. Illustratively, the spaced-apart format of the seven 3-tuples of the last one of the 100 encoded words is represented in the bottom row of FIG. 4.

Other encoding circuit designs which require less storage than the one shown here are possible. However, this design has been presented for simplicity of explanation and because this configuration is quite similar to the decoder configuration described below.

A specific illustrative decoder for an error-control system made in accordance with the principles of the present invention is shown in FIG. 2. In overall configuration, the decoder is similar to the arrangement of the previously described encoder of FIG. 1. More specifically, the decoder includes a 21-stage register 220 and 18 associated 99-stage shift registers 330 through 347. In one mode, the register 220 is controlled by a circuit 201 to operate as a left-to-right shift register having a six-stage parity check digit or syndrome section (stages 0 through 5) and a 15-stage information digit section (stages 6 through 20). In this mode, the output of stage No. 20 is applied to an exclusive-OR circuit 225 and via a switch 209 to an exclusive-OR circuit 226, and the output of stage No. 5 can be applied via a switch 211 either to the circuit 225 or to the circuit 226 and to exclusive-OR circuits 222 and 224. For ease of understanding, the switches 209 and 211 are depicted as being mechanical in nature, but advantageously in practice these switches actually comprise conventional gates whose conditions are controlled by electrical signals applied thereto from the circuit 201.

In another mode of operation controlled by the circuit 201, stages 3 through 17 of the register 220 of FIG. 2 receive signals from and transfer signals to the respective indicated registers 330 through 347. In addition, in this second mentioned mode, input signals received from the channel 106 by conventional receiving equipment 200 are applied (after a series-to-parallel conversion) to stages 0 through 2 of the register 220. In turn, the outputs of stages 0, 1 and 2 respectively appear on leads 230, 231 and 232 and are applied either as inputs to the registers 330, 331 and 332, respectively, or as inputs to a test-for-zero circuit 203. Furthermore, the outputs of stages 18 through 20 of the register 220 are applied to an output utilization circuit 205.

The operation of the decoder shown in FIG. 2 is as follows: First, stages 0 through 20 of the register 220 and all the stages of the registers 330 through 347 are loaded with received digits. This is accomplished by applying received digits in a 3-tuple format to stages 0 through 2 of the register 220. Thus, for example, the first three received digits I1 through I3 are respectively applied to stages 2, 1 and 0. Then I1 through I3 followed by other 3-tuples representative of the remaining information and check digits of the encoded 2,100-digit block are propagated through three at a time of the registers 330 through 347. (The vertically extending output leads of stages 0 through 17 of the register 220 are actually electrically connected to the input leads of the registers 330 through 347. As in the encoding circuitry of FIG. 1, however, these connections are not actually shown but their existence and pattern of interconnections are exactly indicated by the use of reference numerals.) Eventually I1, I2 and I3 are stored in stages 20, 19 and 18, respectively, of the register 220, and 1800 other digits (namely, I4 through I1500 and C1 through C303) are stored in the remaining stages of the register 220 and in the registers 330 through 347. Because the registers included in the decoding circuitry of FIG. 2 are configured and interconnected in essentially the same manner as are the corresponding registers in FIG. 1, the digits eventually stored in stages 0 through 20 of the register 220 correspond in format to the digits represented in row No. 1 of FIG. 3. At this point, before the next 3-tuple of the subsequently received 297 digits is applied to stages 0 through 2 of the register 220, decoding of this first set of 21 digits stored in the register 220 is carried out in a high-speed manner.

Decoding of a 21-digit sequence stored in the register 220 of FIG. 2 involves the following steps: First, with the switches 209 and 211 in their depicted positions, all the stages of the register 220 are shifted 15 times. Then the arm of the switch 209 is controlled to move to its downward position, thereby to interrupt the feedback path that extends from the output of stage No. 20 to the circuit 226. And then only stages 0 through 5 are shifted six additional times. At this point, stages 0 through 5 contain therein a six-digit syndrome or error pattern representation, and stages 6 through 20 again contain the 15 information digits represented in row No. 1 of FIG. 3. Next, with the switches 209 and 211 in the respective positions last mentioned above, stages 0 through 5 are shifted six more times. Following that shifting operation, the representations stored in stages 0 through 2 are tested by the circuit 203 to determine whether or not all three such representations are "0's.' (During this testing phase input gates—not shown—in the registers 330 through 332 are disabled by the circuit 201 to prevent the contents of stages 0 through 2 from being applied to the registers 330 through 332.) If each of stages 0 through 2 contains a "0" representation, any phased error occurrence embodied in the 21-digit sequence being decoded will be manifested in the nature of the three-digit representation stored in stages 3 through 5. In fact, this three-digit representation will actually be identical to any phased three-digit error embodied in the 15 information digits concurrently being decoded. Hence, this representation can be directly utilized as a correction sequence. Of course, if the 21-digit sequence being decoded was received error free, each of stages 3 through 5 will contain therein a "0" representation.

For illustrative purposes, assume that it is determined by the circuit 203 of FIG. 2 that stages 0 through 2 of the register 220 contain an all-0 representation. In response thereto, the circuit 201 in effect causes the arm of the switch 211 to move upward, whereby the output of stage No. 5 will be applied during the next shift interval to the exclusive-OR circuit 225. Subsequently, all 21 stages of the register 220 are shifted in unison three times. During each such shift, one of the information digits stored in stages 18 through 20 is applied to the circuit 225 at the same time that a corresponding one of the correction digits stored in stages 3 through 5 is applied thereto. Accordingly, automatic correction of any erroneous information digits stored in stages 18 through 20 takes place during this three-stage shifting operation. As indicated above, if stages 3 through 5 contain "0's," no alteration of the corresponding information digits applied to the correction circuit 225 will take place during the shifting operation.

On the other hand, assume that it is determined by the circuit 203 of FIG. 2 that stages 0 through 2 of the register 220 do not contain an all-0 representation. In that event, all 21 stages of the register 220 are shifted three times with the switch 211 in its depicted position.

The above-specified testing of the contents of stages 0 through 2 of the register 200, with a subsequent correction of information digits or a subsequent three-stage shifting of the entire register 220, is controlled by the circuit 201 to take place a total of five times. Upon completion of these operations, a correct version of the originally transmitted information digits I1 through I3, I301 through I303, I601 through I603, I901 through I903, and I1201 through I1203 is stored in stages 6 through 20 of the register 220. Accordingly, at the time that the next received 3-tuple (C304 through C306) is applied to stages 0 through 2 and the contents of the bottom-most stages of the registers 330 through 347 are respectively applied to stages 3 through 20, thereby to establish in stages 0 through 20 the 21-digit word represented in row No. 2 of FIG. 3, a correct version of I1 through I3 will be applied from stages 18 through 20 to the output utilization circuit 205.

Ninety-nine additional decoding cycles of the type specified above are effective to automatically correct any error-burst occurrence that is within the aforementioned capabilities of the hereindescribed system. After each such cycle, an additional three correct information signals are available in stages 18 through 20 for application to the circuit 205.

Thus, there has been described herein a specific embodiment of a new class of burst-error-correcting block codes. It is to be understood that this embodiment is only illustrative of the principles of the present invention. In accordance with these principles, numerous other arrangements may be devised by those skilled in the art without departing from the spirit and scope of the invention. For example, although the particular system described herein is adapted to encode and decode binary signals, it is to be understood that the principles of this invention also apply to the processing of nonbinary representations.

What I claim is:

1. In combination, means for supplying a plurality of multidigit information words, means responsive to said supplying means for selecting phased spaced-apart $m$-tuples from said information words, and means responsive to spaced-apart $m$-tuples selected from said information words by said selecting means for generating a group of check digits therefor in accordance with a generator polynomial $g(x)=(x)\ (x^m-1)$ with coefficients in a finite field, where $m$ is a positive integer greater than one and $p(x)$ is an irreducible polynomial of degree $m$.

2. A combination as in claim 1 further including a communication path, means for applying said information words to said path in the order supplied by said supplying means, and means for applying each group of generated check digits to said path in a spaced-apart $m$-tuple format.

3. A combination as in claim 2 further including a decoder connected to said path for receiving information words and check digits that are propagated along said path, said decoder including: a decoding shift register, means responsive to said received words and digits for applying to said register the set of information $m$-tuples from which each associated group of check digits was generated and for also applying the $m$-tuples of said associated group of check digits to said register, and means for processing the contents of said shift register to achieve automatic correction of any error occurrence therein that is limited to one of said $m$-tuples.

4. In combination in an error-correcting system, a source for supplying I multidigit information words, where I is a positive integer greater than one, means responsive to said source for selecting phased spaced-apart $m$-tuples from said information words, and means responsive to a set of information word $m$-tuples provided by said selecting means and spaced apart by $m(I-1)$ digits for generating therefrom an associated group of $2m$ parity check digits in accordance with a burst-error-correcting block code that embodies the capability to automatically correct any error occurrence in said information word $m$-tuples that is limited to one and only one of said information word $m$-tuples, where $m$ is a positive integer greater than one.

5. A combination as in claim 4 further including a communication channel, means for applying said I words to said channel in the order that said words are supplied by said source, and means for applying to said channel each group of generated check digits in a $m$-tuple format in which the check digit $m$-tuples are also spaced apart by $m(I-1)$ digits.

6. In combination in an error control system, means for supplying I multidigit information words, where I is a positive integer greater than one, means responsive to said supplying means for selecting phased spaced-apart $m$-tuples from said information words, means responsive to I sets of phased spaced-apart $m$-tuples of said words provided by said selecting means for generating I multidigit check digit sequences each of which is generated in accordance with the generator polynomial $g(x)=(x)\ (x^m-1)$, where $p(x)$ is an irreducible polynomial and $m$ is the degree of $p(x)$ and is a positive integer greater than one, and means for interleaving phased $m$-tuples of said check sequences in a spaced-apart manner and appending the interleaved $m$-tuples of said check sequences to said information words to form a redundant sequence embodying the capability to automatically correct any error-burst occurrence of length $m$I$-$($mal$ 1) or less.